US012572543B1

(12) United States Patent
Chen et al.

(10) Patent No.: US 12,572,543 B1
(45) Date of Patent: Mar. 10, 2026

(54) GENERAL INCREMENTAL COMPUTATION METHOD BASED ON INTERMEDIATE STATE

(71) Applicant: SINGDATA CLOUD PTE. LTD., Singapore (SG)

(72) Inventors: Wei Chen, Singapore (SG); Longzhong Wang, Singapore (SG); Jinpeng Wu, Singapore (SG); Zhenyu Hou, Singapore (SG); Tao Guan, Singapore (SG)

( * ) Notice: Subject to any disclaimer, the term of this patent is extended or adjusted under 35 U.S.C. 154(b) by 0 days.

(21) Appl. No.: 19/299,748

(22) Filed: Aug. 14, 2025

(30) Foreign Application Priority Data

Jun. 5, 2025 (CN) .......................... 202510741668.X

(51) Int. Cl.
*G06F 16/245* (2019.01)
*G06F 16/2453* (2019.01)

(52) U.S. Cl.
CPC .. *G06F 16/24542* (2019.01); *G06F 16/24537* (2019.01)

(58) Field of Classification Search
CPC ..................... G06F 16/24542; G06F 16/24537
See application file for complete search history.

(56) References Cited

U.S. PATENT DOCUMENTS

| | | | | |
|---|---|---|---|---|
| 10,831,753 B2 * | 11/2020 | Chamieh | ........... | G06F 16/24542 |
| 11,762,855 B1 * | 9/2023 | Akidau | ..................... | G06F 7/14 |
| | | | | 707/717 |

| | | | |
|---|---|---|---|
| 2018/0329955 A1 | 11/2018 | Chaudhuri | |
| 2020/0320074 A1 | 10/2020 | Horn | |

(Continued)

FOREIGN PATENT DOCUMENTS

| | | |
|---|---|---|
| CN | 116680284 A | 9/2023 |
| CN | 116821209 A | 9/2023 |

(Continued)

OTHER PUBLICATIONS

Liu Wei-xue, Query Optimization Principle and Optimized Instance Analysis Computer Technology and Development, No. 11, Aug. 27, 2013, Entire document (abstract).

(Continued)

*Primary Examiner* — Alicia M Willoughby

(57) ABSTRACT

The present invention discloses a general incremental computation method based on an intermediate state, wherein the general incremental computation method comprises: rewriting a logical execution plan to obtain an incremental execution plan corresponding to the logical execution plan, which comprises the following steps: S1: acquiring and parsing a user SQL to generate a logical execution plan; S2: screening and judging operators, and selecting a persisted target operator; S3: persistently storing the persisted target operator; S4: performing state matching between the logical execution plan in the intermediate state and a current execution plan through an algorithm so that all operators find equivalent operators corresponding thereto; S5: reading a last aggregation result of the incremental execution plan and merging the last aggregation result with an incremental aggregation result computed by current incremental data to acquire a final execution plan; and S6: monitoring, updating and maintaining the final execution plan in real time.

5 Claims, 8 Drawing Sheets

(56)            References Cited

U.S. PATENT DOCUMENTS

| 2021/0263929 A1* | 8/2021 | Chen ................. G06F 16/24539 |
| 2025/0217363 A1* | 7/2025 | Armbrust ......... G06F 16/24542 |

FOREIGN PATENT DOCUMENTS

| CN | 117688032 A | 3/2024 |
| JP | 2001222452 A | 8/2001 |
| WO | 2025097738 A1 | 5/2025 |

OTHER PUBLICATIONS

Ying Changtian, Yu Jiong, Bian Chen, Wang Weiqing, Lu Liang, and Qian Yurong, Criticality Checkpont Management Strategy Based on RDD Characteristics in Spark Journal of Computer Research and Development, No. 12, Dec. 15, 2017, Entre document (abstract).

\* cited by examiner

--Prior Art--

```
INSERT OVERWRITE TABLE res
SELECT * FROM
    (SELECT *, AVG(c1) as _avg FROM T2)  t2
INNER JOIN
    (SELECT * FROM T1) t1
on t1.join_key = t2.join_key
```

Logical execution plan

Rewriting logical execution plan
to generate an intermediate state

GENERAL INCREMENTAL COMPUTATION METHOD BASED ON INTERMEDIATE STATE

CROSS-REFERENCE TO RELATED APPLICATIONS

This application claims priority to Chinese Patent Application No. 202510741668.X, filed on Jun. 5, 2025, the entire disclosure of which is incorporated herein by reference.

TECHNICAL FIELD

The present invention relates to the technical field of big data, in particular to a general incremental computation method based on an intermediate state.

BACKGROUND

General incremental computation: in a big data system, an incremental computation technology is an efficient method to deal with data changes. It only computes newly added or modified parts of data, instead of processing the full data every time, so that the processing efficiency can be improved and the resource consumption can be reduced significantly. For example, in an e-commerce system, a large number of new order data are generated every day, and with incremental computation, only newly generated orders of that day need to be processed without recomputing all the order data in the past. The general incremental computation technology is oriented to a general scene, and current three modes of flow, batch and interaction are unified through a set of incremental computation logic. It is different from the incremental computation of streaming computation.

SQL query: the SQL query is an important means for users to interact with the big data system, which allows the users to extract required data from one or more tables according to specific conditions and needs. By writing SQL query statements, the users can specify data columns to be retrieved, screening conditions, sorting rules and data grouping methods.

SQL query optimizer: the optimizer is a crucial component in the big data system, which is mainly responsible for generating efficient execution plans for queries, thus significantly improving the query performance.

Execution plan: the execution plan describes a series of operation steps and sequences taken by the data system to complete a specific SQL query. It is an optimal execution plan generated by the optimizer according to query statements, metadata (such as a table structure, index information, etc.) and statistical information (such as data distribution, a number of rows, etc.), and will be allocated and placed on a real physical machine for execution, and finally a computation result will be obtained.

Intermediate state: the intermediate state is a temporary result set in a process of incremental computation, which needs to be persisted on a storage medium. Each incremental task can rely on the intermediate state of a previous incremental refresh and continue to perform incremental updating, so as to accelerate the execution efficiency of some tasks.

Scan operator: the scan operator is a basic operational character in a query execution plan, which is mainly used to read data from physical storages (such as a disk and an internal storage) and provide original data input for subsequent data processing steps.

Aggregate operator: the aggregate operator is a key component in query processing and big data processing frameworks for summarizing and accounting operations on data. Its main function is to perform aggregate computation on a set of data according to specific rules, converting multiple input rows into one or more output rows.

Window operator: the window operator is a key component in a big data framework for aggregating and sorting data by partitions and then performing corresponding computation.

Join operator: the join operator is an important operation in a query and data processing framework for merging data from two or more data sources.

Sink operator: the sink operator is a key component in a data processing flow, which plays an important role in both stream processing and batch processing systems, and which is mainly responsible for outputting processed data to an external storage system or other target locations, and is an "exit" of a data processing pipeline.

Generating a general incremental computation execution plan in the prior art can be divided into the following steps, as shown in FIG. 2.

1. Query Parsing

The big data system first performs lexical analysis on an input SQL query statement, and splits the statement into independent lexical units (Token), such as keywords (i.e., SELECT, FROM, WHERE), identifiers (table names, column names), operators (such as +, −, *, /) and constants (numbers, strings), etc. According to the lexical units obtained from the lexical analysis, a syntax tree (Syntax-Tree) is constructed according to syntax rules of the SQL language. The syntax tree is a tree structure, which reflects a syntactic structure and logical relationship of query statements. The syntax tree is semantically checked to ensure that the query statement is semantically correct. This check includes checking whether a table name and a column name exist, whether data types are matched, and whether a permission is sufficient.

2. Generating a Logical Execution Plan

The checked AST is converted into a Logical Query Plan. The Logical Query Plan is a representation form based on relational algebra, which describes logical operation steps of a query without involving specific physical implementation details. Common logical operations include Selection, Projection, Join, Aggregation and so on.

3. Query Optimization

The query optimizer performs a series of equivalent transformations on the logical execution plan, transforming it into a form that is easier to optimize and execute, for example, converting a subquery into a join operation or simplifying a complex expression. The system will use two types of optimizers to optimize the execution plan: a Rule-based Optimizer (RBO) and a Cost-based Optimizer (CBO).

The RBO will rewrite the execution plan first. This process is based on a series of optimization rules, which can perform equivalent transformation on the logical plan, thus obtaining a better logical plan. Common logic optimization includes Predicate Pushdown, Projection Pruning, connection order adjustment, etc. For example, the predicate pushdown rule will advance filtering conditions to the data source for execution as much as possible, reducing a data volume of subsequent operations.

After a basic optimization operation is completed, the CBO will begin to transform the optimized logical plan into the Physical QueryPlan. The Physical Query Plan describes a specific execution mode of the query, including an algorithm used, a data access mode, a parallel execution strategy, etc. At this stage, the optimizer will consider characteristics of data sources, system resources and other factors, and select appropriate physical operators to achieve logical operations. For example, for the join operation, an appropriate join algorithm (such as nested loop join, hash join, etc.) will be selected.

At the same time, the CBO will also try to perform incremental rewriting on the execution plan, such as replacing the data source (Scan) with a mode of reading increments, and gradually replacing each operator with a form of incremental computation (different operators have different incremental algorithms) upwards gradually, and finally completing the generation of the incremental execution plan. As shown in FIG. 3, a specific example of rewriting an incremental execution plan is given, in which Scan only needs to be simply replaced with the mode of reading incremental data, subsequent Filter naturally has the ability to consume arbitrary streaming data without any rewriting, and the final Sink operator needs to be changed from a mode of full coverage data to a mode of adding incremental data, thus completing simple incremental task rewriting.

4. Execution Plan

The final Physical QueryPlan will be handed over to a specific execution engine for execution. According to the description of the physical plan, the execution engine reads data from the data source, processes it according to specified operation steps, and returns query results.

It can be seen that the generation of an incremental execution plan is completed in a CBO engine. In this complex process, different operators generate corresponding sub-execution plans according to their unique algorithm logic, aiming at accurately outputting incremental data corresponding to the operators. This process seems to be orderly, but there are hidden efficiency risks. A common incremental computation engine has a significant shortcoming, that is, it does not introduce a key concept of state storage. State storage is like a "memory bank" of data, which can record intermediate results and state information in a computation process and provide a fast way to obtain historical results of subsequent computation.

Referring to FIG. 4, it shows an incremental rewriting algorithm for the Scan operator and the Aggregate operator, wherein the Scan simply needs to be changed to the mode of reading incremental data; however, the Aggregate needs to scan historical data to recompute a previous result, then read both incremental data and historical data, merge the incremental data and the historical data to compute a current full result, and offset them against each other to derive a current incremental result. This algorithm is very inefficient, which is equivalent to computing a large amount of data twice, resulting in the waste of computing resources, and increased computing time. A core goal of incremental computation is to consume only incremental data and obtain the latest computation results at the least cost. However, existing algorithms obviously fail to achieve this goal, thereby preventing the advantages of incremental computation from being fully leveraged.

In view of this, a brand-new computation framework is urgently needed to improve the overall performance of incremental computation. This new framework should fully consider the importance of state storage, and avoid unnecessary repetitive computation by reasonably recording and utilizing the intermediate state.

SUMMARY

An objective of the present invention is to provide a general incremental computation method based on an intermediate state to overcome the shortcomings in the prior art.

In order to achieve the above objective, the present invention provides the following technical solution.

The present application discloses a general incremental computation method based on an intermediate state, including: rewriting a logical execution plan to obtain an incremental execution plan corresponding to the logical execution plan, which comprises the following steps:

S1: acquiring and parsing a user SQL to generate a logical execution plan;

S2: screening and judging operators, and selecting a persisted target operator;

S3: persistently storing the persisted target operator;

S4: performing state matching between the logical execution plan in the intermediate state and a current execution plan through an algorithm so that all operators find equivalent operators corresponding thereto;

S5: reading a last aggregation result of the incremental execution plan and merging the last aggregation result with an incremental aggregation result computed by current incremental data to acquire a final execution plan; and S6: monitoring, updating and maintaining the final execution plan in real time.

The S2 comprises the following sub-steps:

S21: judging whether the operators are stateful, wherein an aggregate operator, a window operator and a join operator are stateful operators;

S22: judging whether a state of the operator is itself, and if not, rewriting; and S23: if a state required by a current operator is its input node, selecting a location that is most worthy of being saved.

The S22 comprises the following contents: judging the aggregate operator according to a type of an aggregate function: if the aggregate function is of a SUM and COUNT type, the state of the aggregate operator being itself; if the aggregate function is of an AVG type, rewriting the type as the SUM and COUNT type; and if the aggregate function is of a MIN and MAX type, then when its input data is append-only, considering its output result as the state; otherwise, considering its input data as a state node.

The S22 comprises the following contents:

S221: judging the type of the input data of the operator itself, including append-only, delete-only and both; and S222: judging whether the intermediate state has been explicitly presented in an initial logical execution plan; and if not, rewriting the intermediate state to make the intermediate state a state worthy of being saved.

The S3 comprises the following contents: for the persisted target operator, after selecting a creation location of the intermediate state, adding an additional sink to the current execution plan, persistently storing contents of a current node in the storage medium, and recording relevant information to track created several intermediate states.

The S4 comprises the following contents: implementing matching of two logical execution plans by an algorithm matched with the intermediate state, sequentially matching operators of the logical execution plan of the intermediate state and the logical execution plan generated by a query from bottom to top until a root node, and after the matching is completed, replacing the logical execution plan of an entire view with a scan operation on the view; and at this time, generating a tree composed of several compensate operators followed by a scan operator, the tree being equivalent to a certain node in the logical execution plan generated by the query.

The matching of two logical execution plans in the S4 comprises the following contents: matching results comprising: unmatched, completely matched and partially matched; in partial matching, computing and generating a compensate operator that continuously pulls up until the compensate operator traverses a subsequent series of nodes needing matching; and if the compensate operator is unable to compute or pull up, rendering a view matching failure.

The S6 comprises the following contents:

S61: monitoring an updating situation of the intermediate state in real time to ensure consistency of data;

S62: automatically recycling the state subjected to multiple matching failures and releasing an occupied storage space; and S63: when the SQL is changed, adaptively updating state storage.

The present application also discloses a general incremental computation apparatus based on an intermediate state, comprising a memory and one or more processors, wherein the one or more processors, when executing the executable codes, are configured to implement the general incremental computation method based on the intermediate state described above.

The present application also discloses a computer-readable storage medium having stored thereon a program which, when executed by a processor, implements the general incremental computation method based on the intermediate state described above.

The present invention has the following beneficial effects.

(1) According to this solution, by introducing the concept of state storage to a general incremental computation framework, a complex computation result set is cached in a persisted storage medium, so that repetitive computation of the same historical data is avoided and the time and resources required for computation are greatly shortened and reduced. It makes it possible to get results at a faster speed when dealing with large-scale data, thus providing more timely and accurate support for the decision-making of enterprises and organizations. It demonstrates outstanding advantages in improving the execution performance of incremental computation, and is expected to play an important role in the field of big data processing and promote the development and progress of the industry.

(2) This solution completely puts forward specific maintenance behaviors for each lifecycle phase of the intermediate state from creation to deletion, enabling it to play an adaptive role in complex systems and massive query operations. The workloads of data developers and practitioners are significantly reduced, allowing the developers and practitioners to focus more on business system development rather than fine-tuning massive details of existing links one by one, thereby substantially liberating the productivity of enterprises and individuals.

The features and advantages of the present invention will be described in detail by embodiments with the accompanying drawings.

DETAILED DESCRIPTION

In order to make the objectives, technical solutions and advantages of the present invention more apparent, the present invention is further described in detail below with reference to the accompanying drawings and embodiments. However, it should be understood that the specific embodiments described herein are only for explaining the present invention, and are not intended to limit the scope of the present invention. In addition, in the following description, descriptions of well-known structures and techniques are omitted so as to not unnecessarily obscure the concepts of the present invention.

Figure 1:
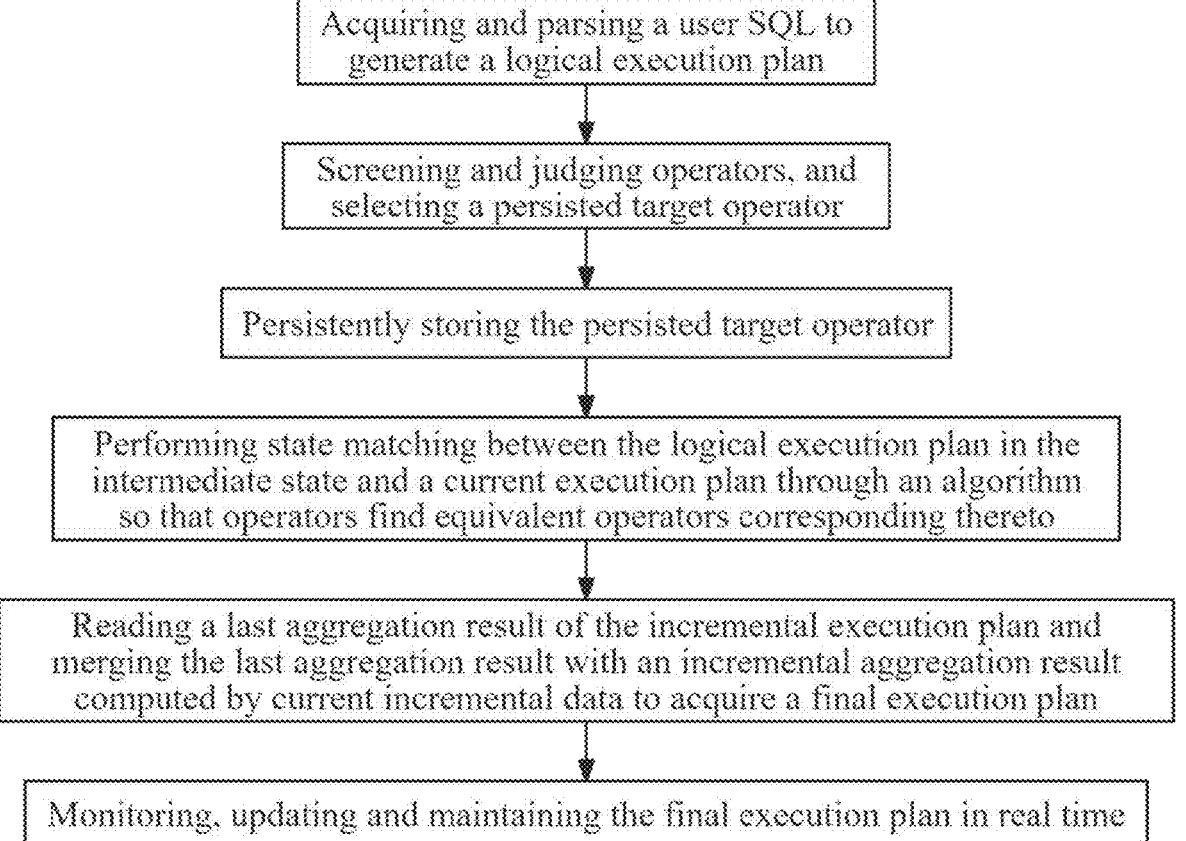
FIG. 1 is a flow chart of steps of a general incremental computation method based on an intermediate state of the present invention.
Figure 2:
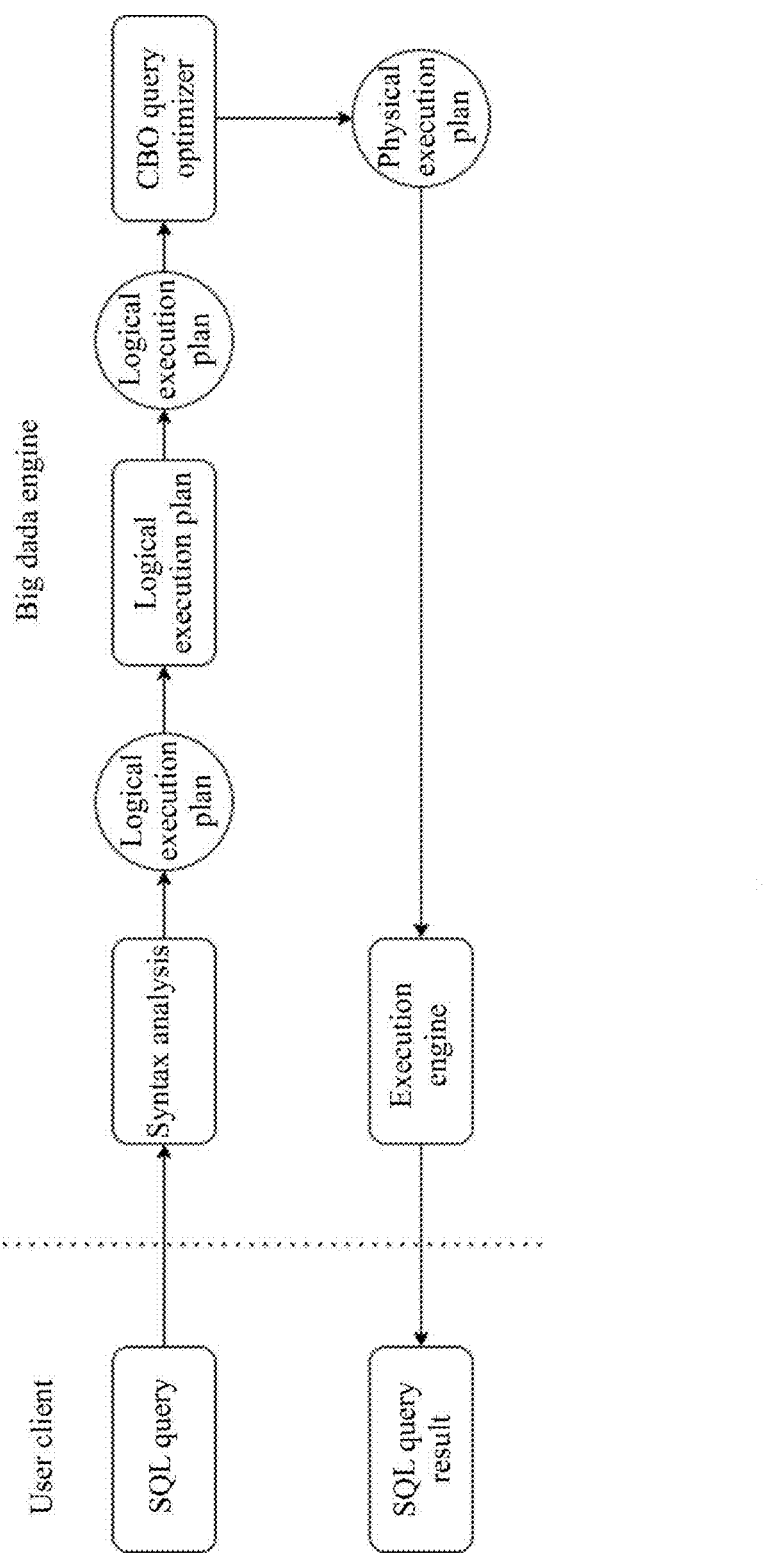
FIG. 2 is an existing schematic diagram of generating a general incremental computation execution plan of the present invention.

Referring to FIG. 1, an embodiment of the present invention provides a general incremental computation framework based on an intermediate state, which greatly improves the execution performance of incremental computation by caching a complex computation result set in a persistent storage. The main effects are shown as follows: with this efficient caching mechanism, this framework can introduce many advanced and efficient incremental computation algorithms, so that many efficient incremental computation algorithms can be used to complete query computation. By reloading a state cached in a last computation in each incremental computation task, a huge overhead caused by repetitive computation can be avoided, thus greatly improving the execution efficiency of the incremental computation.

At the same time, this framework needs to systematically solve various problems related to the intermediate state. Firstly, the selection of the intermediate states is a problem. In massive data and a complicated computation process, how to accurately select those intermediate states that really have a key impact on the computation results is a very challenging task.

Secondly, how to achieve complete matching of the intermediate states is also a key link. In the computation process, the intermediate states may change dynamically with the change of data and the advancement of computation. It is necessary to ensure that during each query, the corresponding intermediate state can be accurately and reliably found.

Furthermore, the updating of the intermediate states cannot be ignored. As new data continuously flows in and the computation persistently proceeds, the intermediate states need to be updated in time to ensure their consistency with the latest data and computation results.

Finally, maintaining the validity of the intermediate states is the foundation of the stable operation of the whole framework. In practical application, the intermediate states may be affected by various factors, such as data errors and system failures, which will threaten its validity. It is necessary to establish a comprehensive monitoring and maintenance mechanism that enables real-time monitoring of the validity of the intermediate states, to allow timely repair and adjustment once issues are detected.

At the same time, the intermediate states need to be cleaned and optimized regularly to remove those useless or outdated information, so as to improve the running efficiency and performance of the whole framework.

It comprises the following contents.

1. Determining a Location of the Intermediate State

Figure 3:
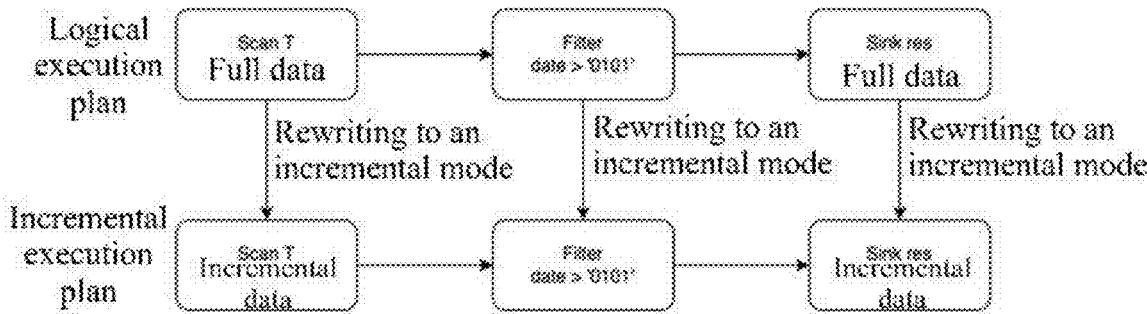
FIG. 3 is an existing schematic diagram of rewriting an incremental execution plan of the present invention.
Figure 4:
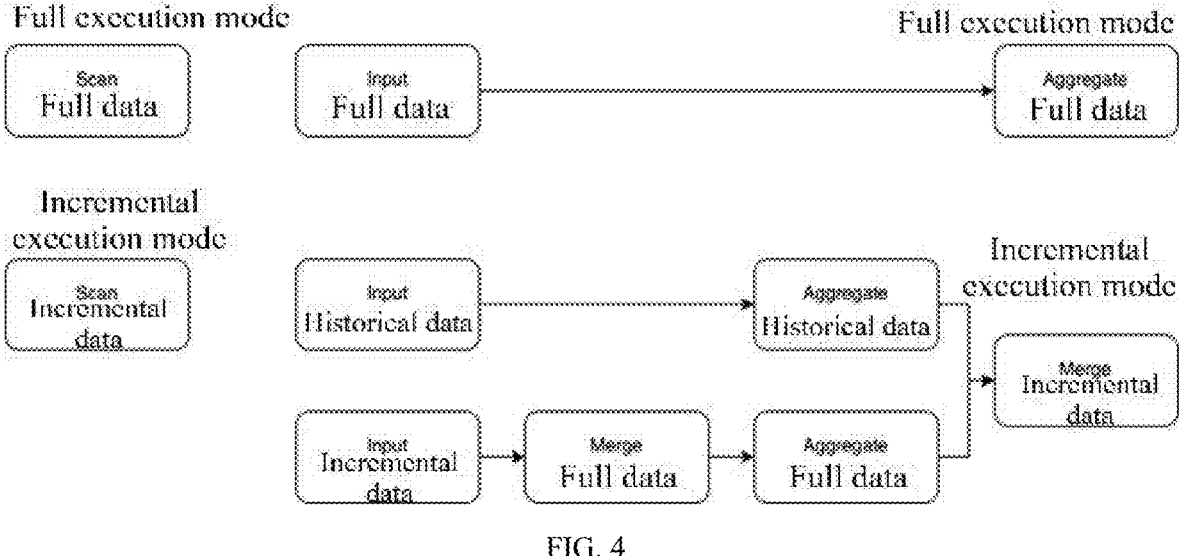
FIG. 4 is an existing schematic diagram of an incremental rewriting algorithm for a Scan operator and an Aggregate operator of the present invention.

Firstly, it should be clarified that not all operators require intermediate states, and the presence of intermediate states does not necessarily guarantee faster computation execution. Therefore, there is a need to determine which operators' results are worthy of being persistently stored and to ensure these results can be used by future computation, achieving the purpose of acceleration. FIGS. 3 and 4 above show incremental execution plans for two different operators. The computation shown in FIG. 3 primarily transmits results of input data, thus requiring no backtracking of historical data. However, FIG. 4 is an aggregate operation, which needs to be completed by computing the historical data together with newly added input data.

Therefore, there is a need to first provide a distinction for operator types: namely stateful operators and stateless operators. The stateful operator means that any computation needs to rely on a historical computation result, and cannot simply rely on incremental data to complete the current computation; on the contrary, the stateless operator means that any computation can be completed by itself, thus requiring no backtracking of any historical results. There are three main categories of stateful operators: an aggregate operator (Aggregate), a window operator (Window) and a join operator (Join). The intermediate state that needs to be generated mainly depends on these three operators.

Secondly, whether the operator can use the intermediate state is strongly related to the type of the input data itself (whether the input data is append-only/delete-only/both), and different properties will make it apply completely different incremental algorithms. For example, for an aggregate function MAX, if there exists a deletion operation in the input data, and a result of deletion is exactly a value of MAX itself, then the computation of a new result cannot be done on the incremental data anyway.

At the same time, there is another factor that affects the intermediate state, that is, whether the intermediate state has been explicitly presented in the original logical execution plan. Typically, some operators still require a certain degree of equivalent rewriting, so as to be transformed into a state worthy of being saved. For example, a common aggregate function AVG needs to be rewritten in the form of SUM and COUNT, and saving AVG directly will not have any effect, thus, an extra step is needed to rewrite AVG to compute SUM and COUNT first, and then compute SUM/COUNT by a scalar to obtain an original AVG result.

To sum up, the following steps for screening intermediate states can be obtained:

whether a current operator is a stateful computation (Aggregate/Window/Join is regarded as stateful computation)

if "yes":

a. whether the state of the current operator is itself (e.g., for Aggregate, this depends on the type of the aggregate function: SUM/COUNT inherently represent their own state; AVG requires rewriting; MIN/MAX can only be treated as their own state if the input data is append-only; otherwise, their input data becomes a state node).

b. if the state required by the current operator is its input node, it is necessary to find a location that is most worthy of being saved. When judging whether a node is the most valuable storage location at present, reference can be made to the following indicators:

1. The number of data rows of the current node. The number of data rows is a most direct evaluation indicator for evaluating the storage space occupied by the intermediate state. Usually, in a big data system, the number of rows of input data will increase or decrease with different computation types. For example, a filtering operation usually leads to fewer rows, while a multi-table connection operation will lead to more data, and storing a node with a relatively small amount of data will generate benefits in state storage and reuse.

2. Computational complexity of the current node. When storing the input nodes of the current operator, traversing downward through the logical execution plan means that each additional layer of operators traversed will require re-computation during state reuse. For example, given an execution plan A←B←C←..., if a node B is directly saved for a node A, then during subsequent computation of A, the state of the node B can be directly read to eliminate repetitive computation. At this time, C can be regarded as a state that can be saved, but for A, the computation of the node B needs to be performed again after the state of C is read every time. To sum up, a balance can be found between the number of data rows of each node and the computational complexity, that is, when the cost of reading low-level operator data plus the overhead of recomputing unsaved high-level node data is less than the overhead of reading the high-level node data directly, a more suitable storage location is found.

3. Whether the current node contains columns that enable data pruning. In an incremental task computation process, a significant portion of data does not need to be reprocessed. For example, for the aggregate operation, all affected results in a single incremental computation are selected by a Group Key of the incremental data, and the rest data do not participate in the computation, so that data pruning can be performed on the intermediate state according to the Group Key. However, if an operator regarded as a state node does not have these columns, the operator needs to be forced to scan out the full data, and the acceleration effect is greatly reduced.

Figure 9:
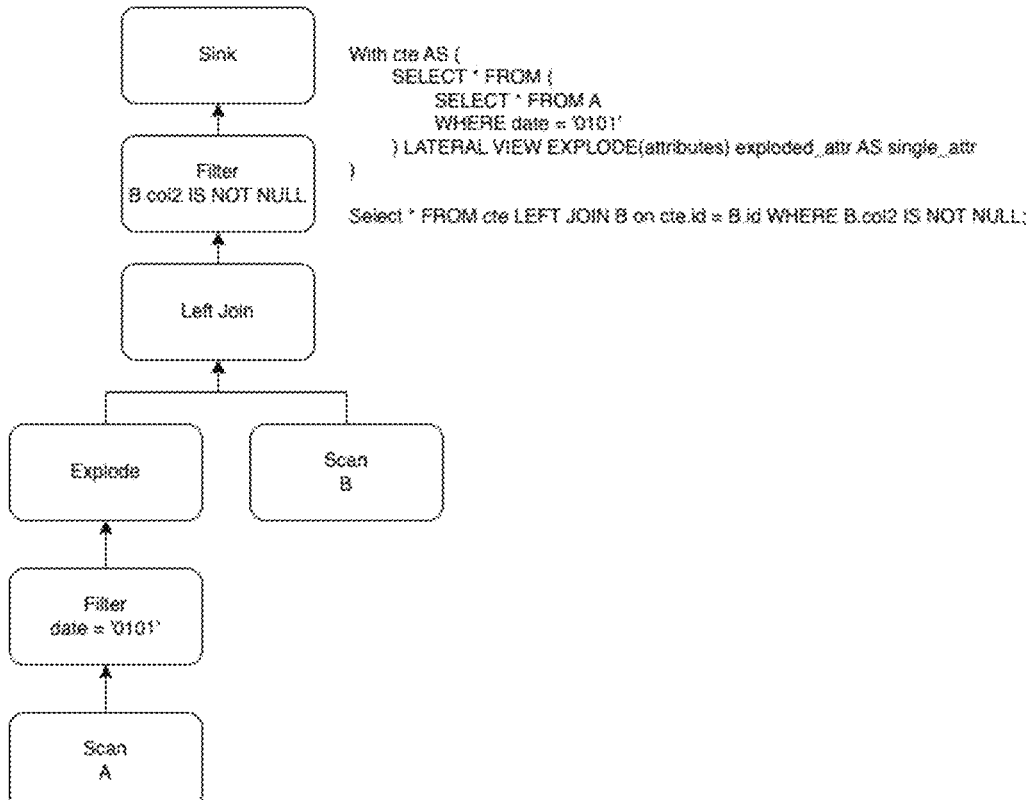
FIG. 9 is a schematic diagram of a judging process of a state operator of the present invention.

In a specific example as shown in FIG. 9, for Join computation, the left side and the right side are the states that need to be saved. For the left side, there are three options: 1. saving Explode; 2. saving Filter; and 3. saving Scan. Among these three choices, the judgement can be made according to the aforementioned rules. First, when encountering the stateful operator Explode, which is an operation that expands a single row into multiple rows, it introduces multiplicative data expansion to the state node. This makes it a suboptimal option compared with other options. Continuing downward traversal from the Explode operator, the Filter operator is encountered. As a filtering operator, the Filter operator filters input data and retain only a part of results. Therefore, it is worth considering that if the filterability is very good (that is, it can filter the input data to retain only a small part of results), even recomputing Explode could yield a positive benefit. But if the filterability is very poor, then the other operators are traversed downward and observed continuously. Finally, the operator Scan is encountered, which is a read operation (that is, data to be read has been persisted and thus does not need to be saved again), Scan will not be regarded as a state node. To sum up, the results of saving Filter may be the best choice to some extent.

c. if the above two are not satisfied, no state will be saved. Most common computational logic will meet the judgement standard of a or b, that is, the decision rules have covered most practical scenarios.

If "no": the operator itself does not need to create additional state storage. At this time, it is necessary to judge whether the current node needs to be saved according to the subsequent nodes.

More detailed decision rules are recorded in Table 1.

TABLE 1

| Operator type | Input data | |
| --- | --- | --- |
| | Append-only | Append & Delete |
| Aggregate | For functions that can be computed linearly (MIN/MAX/COUNT/SUM/ COLLECT_LIST/ . . . ), the state is the result of Aggregate itself. For functions that do not have linear computing ability, if they can be rewritten into a combination of linear functions (such as AVG . . . ), rewriting is performed; if they cannot be rewritten (such as PERCENTILE . . . ), a Partial state of Aggregate (without final aggregation) is regarded as the state node. | For functions that support rollback (COUNT/SUM/ COLLECT_LIST/ . . . ), the state is the result of Aggregate itself. For functions that do not support fallback, the input node of Aggregate is regarded as the state node. |
| Window | Does Window satisfy TopK pattern; that is, ROW_ NUMBER/RANK <= N; if yes, a result of Window + Filter is stored as a state; if not, an input of the Window is regarded as a state node. | The input of Window is regarded as the state node. |
| Join | Inputs on both sides of Join are regarded as state nodes. | |

Once a location for creating an intermediate state is selected, an additional Sink will be added to a current execution plan, and the contents of the current node are persisted to the storage medium. The persisted data will also be stored as a normal table (readable and writable, which is no different from a table directly created by a user), and relevant information is recorded in Meta metadata of a current refresh target table, so as to track all the intermediate states created by different tasks.

Where, information to be recorded mainly includes: 1. a name of a table after a current intermediate state is persisted into a table form; 2. a logical execution plan of the current intermediate state, used for node matching during reuse; and 3. a version number of each source table on which the current intermediate state depends, that is, what data it has consumed. According to these three kinds of metadata information, the intermediate state can be completely restored in a subsequent state reuse stage and embedded in the incremental execution plan.

In addition, for stateful operators (Join/Agg/Window), the states they depend on are often strongly correlated with specific columns in the incremental data (JoinKey/ GroupKey/PartitionKey). To accelerate the reuse performance of intermediate states, additional constraints can be automatically established on these correlated columns. Through these characteristics, a state loading process becomes very fast since most state files that are unnecessary to load are directly filtered out. This not only avoids repetitive computation but also further enhances the query execution performance. Specific details are recorded in Table 2.

TABLE 2

| Physical constraint type | Advantages and applicable scenarios |
| --- | --- |
| Cluster Key | The cluster key can physically store data with the same or similar cluster key values together. In this way, when querying a particular type of value, files to be queried will be concentrated in a small physical region, which greatly reduces invalid data reading and improves data reading efficiency. When performing a table join operation, if a join key is consistent with the cluster key, the join operation will be more efficient. Because related data has been aggregated physically, the extra overhead brought by scattered storage of data is reduced and the connection operation is accelerated. |
| Sort Key | The sort key ensures that data is stored in a specified key-value order. This makes it possible to quickly locate and return required data by directly using the ordering of data when conducting range query or sorting query. When the query needs to sort results, if a sort field in a query condition is consistent with the sort key of the table, there is no need to perform an additional sort operation on the data, because the data itself is already in order, thus saving the time and system resources required for sorting. The sort key helps to build a more efficient index. When creating an index, the ordering of data can reduce a depth and a number of nodes of the index and improve the lookup efficiency of the index. At the same time, for the index based on the sort key, the required data block can be located faster when querying. |
| Index | When executing a query, if there is no index, it is usually necessary to scan full data (full table scanning), which will be very time-consuming when the amount of data is large. The index can help the system quickly position a location of the data that meets the query conditions, thus avoiding scanning the full data. Multi-condition queries can be supported conveniently. By intersecting and merging the indexes of multiple keywords, files that meet multiple conditions can be quickly found, so that files which do not need to be read at all are filtered extremely quickly. |

Figure 5:
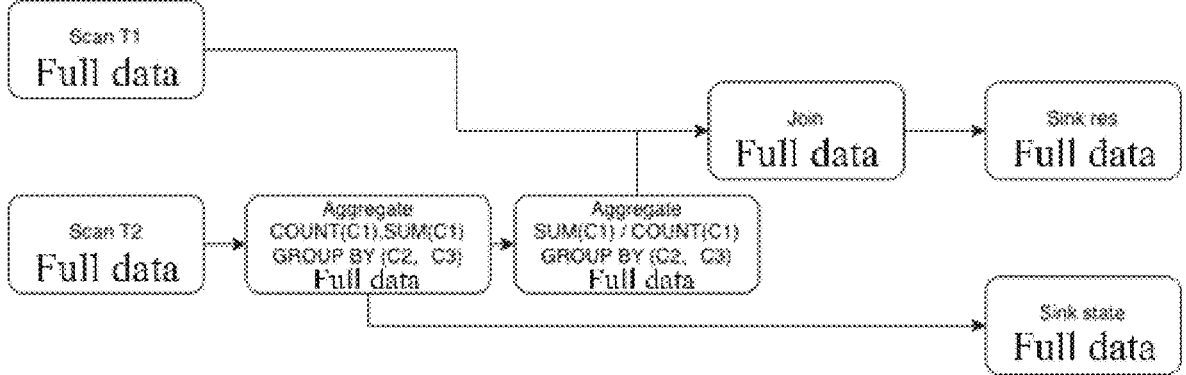
FIG. 5 is a schematic diagram of the rewriting of a logical execution plan of the present invention.

A specific generation process is shown in FIG. 5. Firstly, the user-submitted SQL is compiled into a logical execution plan. Subsequently, the AVG function in the Aggregate operator is split into COUNT and SUM components by the logical execution plan according to the aforementioned judgment rules. These components are then connected to an external Sink operator for persisted storage. Notably, Join is also a stateful operator. However, since the Scan operator on its left has expressed persistent semantics and Aggregate on its right has been saved, Join does not need to store any additional state.

2. Matching the Intermediate State

After the intermediate state is selected and the persistent storage of the intermediate table is completed, the next problem to be considered is how to apply the existing intermediate state to the current query optimization. The following two solutions are used to accomplish the reuse of the intermediate state.

a. The original execution plan is broken directly from the intermediate state into two parts, and the two parts are regarded as two execution sub-fragments up and down sequentially, and these sub-fragments are fixed directly in the Meta metadata, and are taken out to be directly executed in order when it is time for the next execution (the part of data source-intermediate state is executed first, and then the part of intermediate state-output is executed). Once the intermediate state is created, all the execution plans will be carried out step by step, and it will be ensured that the intermediate state will be used certainly.

b. The original execution plan is kept unchanged, the intermediate state is selectively placed in the original execution plan every time as a node that can be equivalently replaced, and the optimizer can freely choose whether to use the last saved intermediate state according to a cost model.

After repeated evaluation, it is decided to use the second solution, which can decouple the intermediate state from an original query of the user, that is, the state is only a tool that can be used dynamically to speed up the query, and it is not a part necessarily used by the original query. Whenever the user decides to change the SQL of the query, these decoupled states can be upgraded/eliminated/regenerated adaptively independently. This gives the system and users more freedom.

Thus, a brand-new algorithm of intermediate state matching (View-based Optimization, Vbo in short hereinafter) is derived. The problem of intermediate state matching is regarded as a sub-problem of view rewriting (that is, how to rewrite an arbitrary Query of the user with a defined View), and it is solved by an optimizer-related technology. From the optimizer's point of view, view matching can be abstracted into the matching problem of two logical execution plans. That is, the intermediate state has a logical execution plan P1, the logical execution plan generated by the query that needs to be accelerated is P2, and both the logical execution plans are composed of several operators. When these two logical execution plans are input into Vbo, the framework will match operators one by one from the bottom up, that is, starting from the Scan root node at the lowest layer and progressing upward layer by layer.

There are several possibilities for matching at each layer: unmatched: at this time, the materialized view matching has failed; completely matched: it will continue to match upwards; partially matched: that is, the query requires fewer rows and columns than those available in the view, and at this time it is necessary to compute a compensating filter or project (or potentially other operators). This compensation will be pulled up step by step, to traverse a subsequent series of nodes needing matching. If the compensation cannot be computed or pulled up, it also means that the view matching has failed. If the view is successfully matched all the way up to the root node in the end, then the logical execution plan of the entire view can be replaced with a Scan operation on the view.

At this time, a logical execution plan will be formed, which is composed of several compensate operators connected in series, among which a root node is an operator that reads data of the view. That is, after a series of transformations, the state that was previously saved can be re-equivalent to a certain location in the currently matched execution plan through short computation. This provides strong flexibility in storing intermediate states. Even if the system undergoes iterations over a period of time, resulting in discrepancies between the current execution plan and the execution plan originally used for state storage, outdated state nodes can still be used in the current execution plan through a series of computational transformations.

Figure 6:
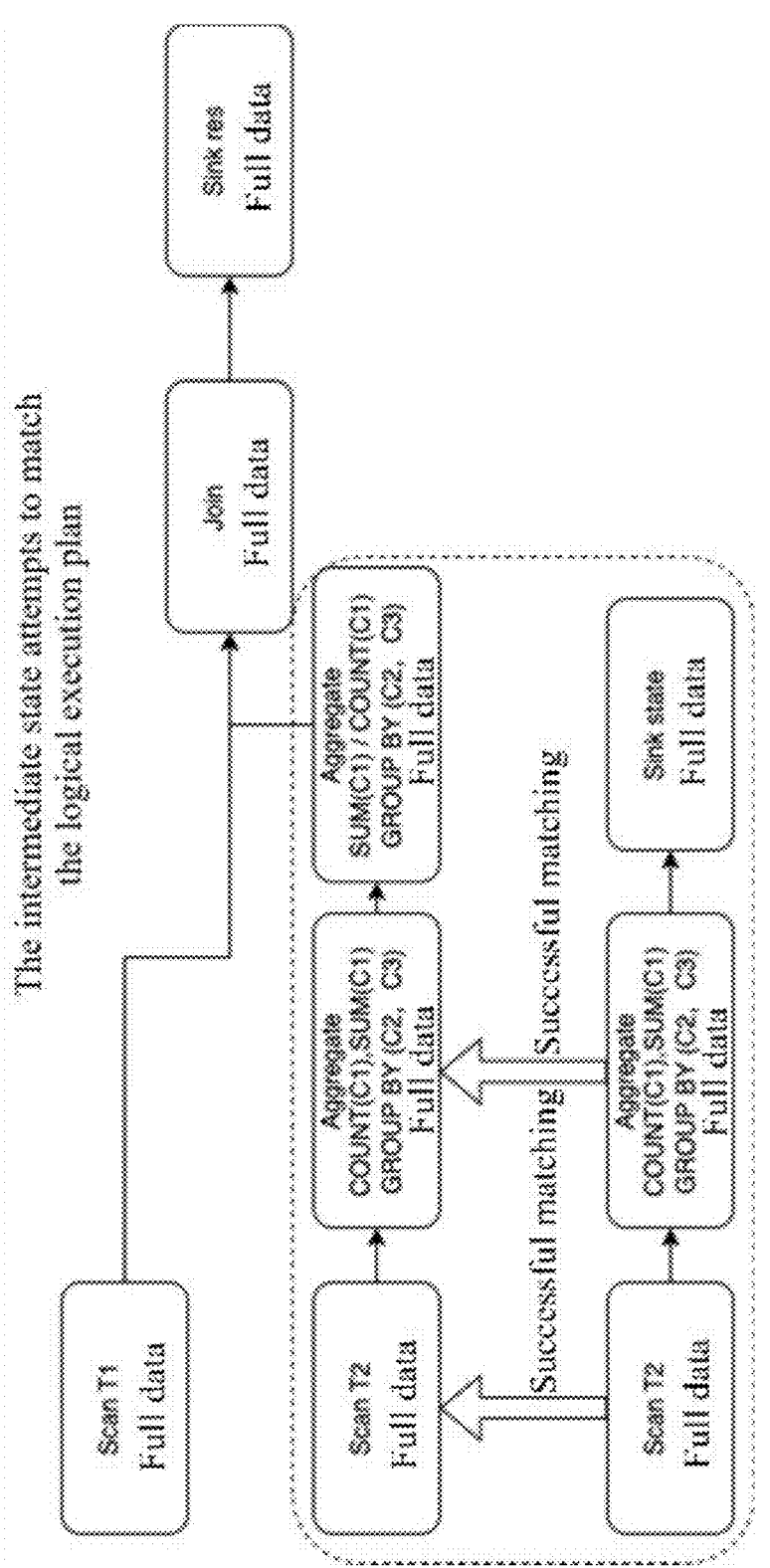
FIG. 6 is a schematic diagram of state matching between a logical execution plan in an intermediate state and a current execution plan of the present invention.
Figure 7:
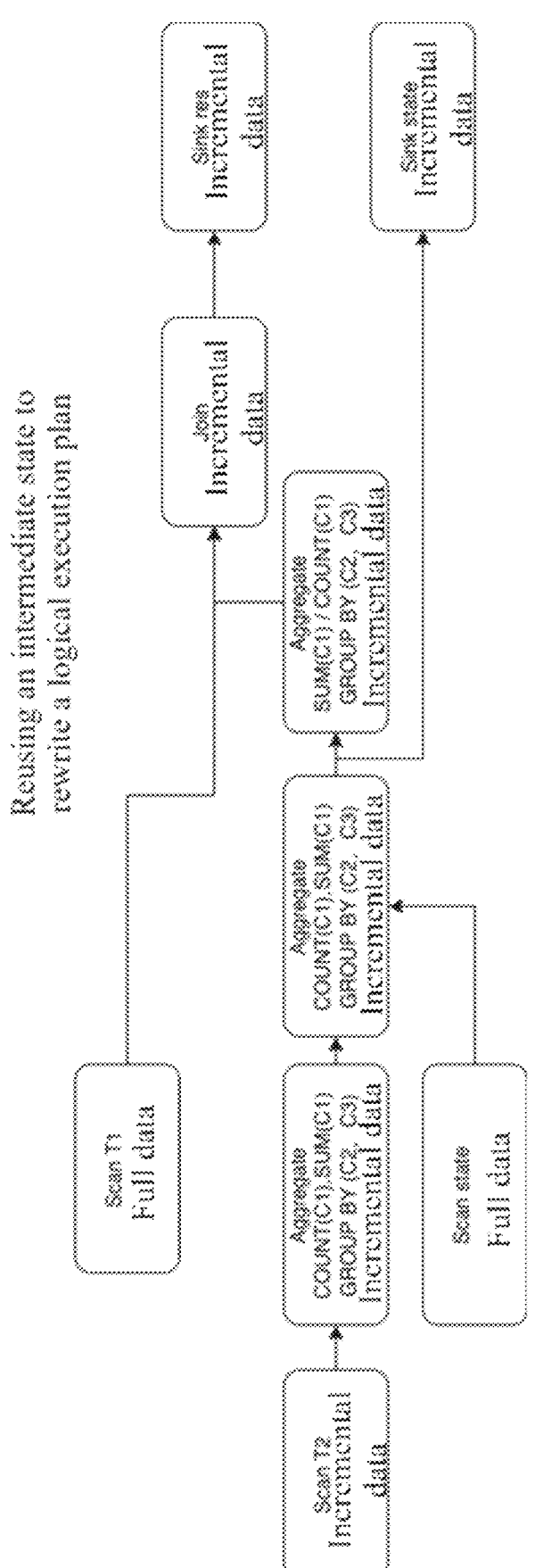
FIG. 7 is a schematic diagram of a final execution plan of the present invention.

A specific process is shown in FIG. 6. The previously saved intermediate state will put the logical execution plan that generated it into Vbo together with the current logical execution plan for state matching. First, the Scan operator is compared, and after successful matching, it will continue to match the remaining operators upwards. Sink is a special persisted operator, which only stores data into the storage medium and will not change any logical semantics, so that it will not participate in state matching. State matching is considered complete once the framework reaches the Aggregate operator, and all operators have found equivalent operators corresponding thereto. Therefore, as shown in FIG. 7, a Scan (state) operator is directly placed into the incremental logical execution plan. This operator can directly read a previous aggregation result and merge it with an incremental aggregation result computed from the current incremental data to produce a final incremental computation expression.

3. Updating and Maintaining the Intermediate State

After the state matching is completed, the intermediate state is placed in the execution plan in the form of the Scan (state), and an additional corresponding Sink (state) is generated to write state updates in this refresh task. Any state will have a Sink (state) to ensure the consistency of data.

In addition, if a state consistently fails to match across multiple refresh tasks (e.g., SQL changes/major version code changes, resulting in a large change to the execution plan and no longer compatible with the old version), it is automatically recycled by the system to free up the occupied storage space. Its corresponding metadata information will also be automatically reclaimed.

Especially, when the SQL is changed, the state storage will be updated adaptively.

For example, the original SQL is

" . . . . SELECT COUNT (*) FROM SubQuery GROUP BY C1, C2;"

the state at this time is equivalent to SQL:

" . . . . SELECT COUNT (*) FROM SubQuery GROUP BY C1, C2;"

the changed SQL is

" . . . . SELECT COUNT (*) FROM SubQuery GROUP BY C1;"

a new state is equivalent to SQL:

" . . . . SELECT COUNT (*) FROM SubQuery GROUP BY C1;"

It is easy to adaptively update from the first state to the second state, that is new_state=SELECT SUM (COUNT (*)) FROM old_state GROUP BY C1;

the link upgrade can be completed with greatly reduced overhead. It is worth noting that this equivalent upgrade will only be performed once, and after a new state is successfully created, the old state will be automatically reclaimed to release the space it occupies. The upgrade process is also completed by the Vbo matching algorithm, that is, the old state needs to add an additional aggregate operator for equivalent compensation, and it is considered that the result after re-aggregation based on View is equivalent to the result of the current operator.

Figure 8:
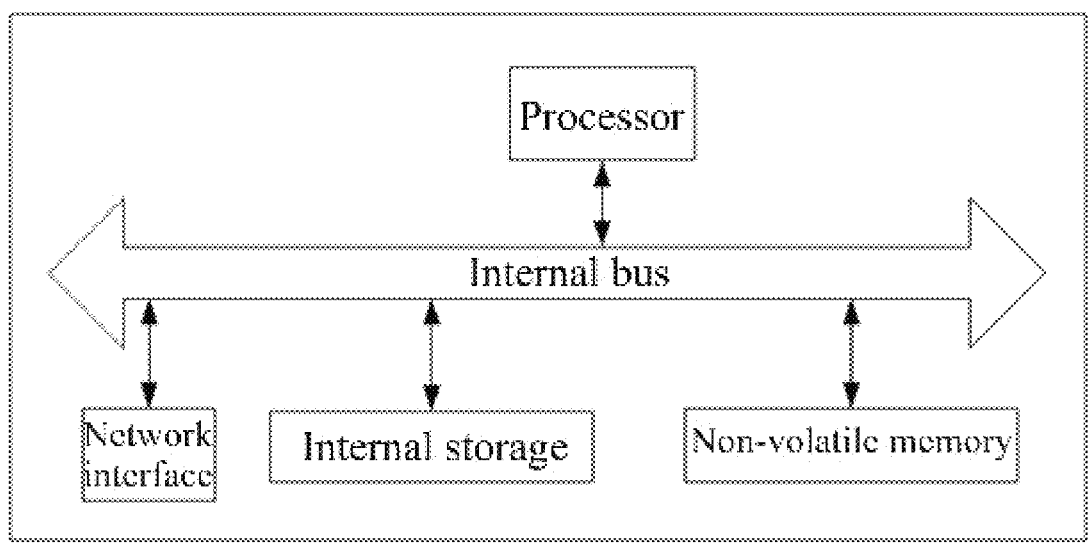
FIG. 8 is a schematic diagram of an apparatus of the present invention.

The embodiment of the general incremental computation apparatus based on the intermediate state of the present invention can be applied to any device with data processing capability, which can be devices or apparatus such as computers. The apparatus embodiment can be implemented by software, or by hardware or a combination of hardware and software. Taking a software implementation as an example, as a logical apparatus, it is formed by reading corresponding computer program instructions in a non-volatile memory into an internal storage through a processor of any device with data processing capability. From the hardware level, as shown in FIG. 8, it is a hardware structure diagram of any device with data processing capability where the general incremental computation apparatus based on the intermediate state of the present invention resides. In addition to the processor, the internal storage, a network interface and the non-volatile memory shown in FIG. 8, any device with data processing capability where the apparatus in the embodiment resides usually includes other hardware according to actual functions of the device with data processing capability, which is omitted here. Implementation processes of functions and roles of the units in the aforementioned apparatus are detailed in the implementation processes of the corresponding steps of the aforementioned method, and are omitted here.

For the apparatus embodiment, since it basically corresponds to the method embodiment, reference may be made to the partial description of the method embodiment for relevant points. The apparatus embodiments described above are only schematic, and the units described as separate parts may or may not be physically separate, and the components displayed as units may or may not be physical units, that is, they may be located in one position, or may be distributed on a plurality of network units. Some or all of the modules may be selected according to actual needs to achieve the objectives of the present invention. One of ordinary skill in the art can understand and implement without inventive effort.

An embodiment of the present invention also provides a computer-readable storage medium having stored thereon a program which, when executed by a processor, implements the general incremental computation apparatus based on the intermediate state in the above embodiments.

The computer-readable storage medium may be an internal storage unit of any device with data processing capability as described in any of the previous embodiments, such as a hard disk or a memory. The computer-readable storage medium may also be an external storage device of any device with data processing capability, such as a plug-in hard disk, SmartMediaCard (SMC), SD card, FlashCard, etc. provided on the device. Further, the computer-readable storage medium may also include both the internal storage unit and the external storage device of any device with data processing capability. The computer-readable storage medium is used for storing the computer program and other programs and data required by any device with data processing capability, and can also be used for temporarily storing data that has been output or will be output.

The described above is merely preferred embodiment of the present invention and should not be taken as limiting the present invention. Any modification, equivalent replacement, or improvement made within the spirit and principle of the invention should be included in the protection scope of the present invention.

What is claimed is:

1. A general incremental computation method based on an intermediate state, wherein the general incremental computation method comprising the following steps:

S1: acquiring and parsing a user SQL to generate a logical execution plan;

S2: screening and judging operators, and selecting a persisted target operator;

S3: performing equivalent rewriting on the persisted target operator to generate an intermediate state, and persistently storing the intermediate state in a storage medium;

S4: performing state matching between the logical execution plan in the intermediate state and a current execution plan through an algorithm so that all operators find equivalent operators corresponding thereto;

S5: reading the persisted intermediate state and incremental data, and outputting a final result after combined computation; and S6: monitoring, updating and maintaining the final execution plan in real time; and the S2 comprises the following sub-steps:

S21: judging whether the operators are stateful, wherein an aggregate operator, a window operator and a join operator are stateful operators;

S22: judging whether a state of the operator is itself, and if not, rewriting; and S23: if a state required by a current operator is its input node, selecting a location that is most worthy of being saved; and the S22 comprises the following contents: judging the aggregate operator according to a type of an aggregate function: if the aggregate function is of a SUM and COUNT type, the state of the aggregate operator being itself; if the aggregate function is of an AVG type, rewriting the type as the SUM and COUNT type; and if the aggregate function is of a MIN and MAX type, then when its input data is append-only, considering its output result as the state; otherwise, considering its input data as a state node; and the S22 comprises the following contents:

S221: judging the type of the input data of the operator itself, including append-only, delete-only and both; and S222: judging whether the intermediate state has been explicitly presented in an initial logical execution plan; and if not, rewriting the intermediate state to make the intermediate state a state worthy of being saved, and the S4 comprises the following contents: implementing matching of two logical execution plans by an algorithm matched with the intermediate state, sequentially matching operators of the logical execution plan of the intermediate state and the logical execution plan generated by a query from bottom to top until a root node, and after the matching is completed, replacing the logical execution plan of an entire view with a scan operation on the view; and at this time, generating a tree composed of several compensate operators followed by a scan operator, the tree being equivalent to a certain node in the logical execution plan generated by the query;

the matching of two logical execution plans in the S4 comprises the following contents: matching results comprising: unmatched, completely matched and partially matched; in partial matching, computing and generating a compensate operator that continuously pulls up until the compensate operator traverses a subsequent series of nodes needing matching; and if the compensate operator is unable to compute or pull up, rendering a view matching failure.

2. The general incremental computation method based on the intermediate state according to claim 1, wherein the S3 comprises the following contents: for the persisted target operator, after selecting a creation location of the intermediate state, adding an additional sink to the current execution plan, persistently storing contents of a current node in the storage medium, and recording relevant information to track created several intermediate states.

3. The general incremental computation method based on the intermediate state according to claim 1, wherein the S6 comprises the following contents:

S61: monitoring an updating situation of the intermediate state in real time to ensure consistency of data;

S62: automatically recycling the state subjected to multiple matching failures and releasing an occupied storage space; and S63: when the SQL is changed, adaptively updating state storage.

4. A general incremental computation apparatus based on an intermediate state, comprising: a memory and one or more processors, wherein the memory has stored therein executable codes, and the one or more processors, when executing the executable codes, are configured to implement the general incremental computation method based on the intermediate state according to claim 1.

5. A non-transitory computer-readable storage medium, wherein the non-transitory computer-readable storage medium has stored thereon a program which, when executed by a processor, implements the general incremental computation method based on the intermediate state according to claim 1.

* * * * *